United States Patent [19]

Seppänen

[11] Patent Number: 5,736,729

[45] Date of Patent: Apr. 7, 1998

[54] DATA TRANSMISSION CARD AND HOLDING CASING

[76] Inventor: Tauno Seppänen, Solnantie 35 A, FIN-00330, Helsinki, Finland

[21] Appl. No.: 649,600

[22] PCT Filed: Nov. 24, 1993

[86] PCT No.: PCT/FI93/00496

§ 371 Date: Sep. 26, 1996

§ 102(e) Date: Sep. 26, 1996

[87] PCT Pub. No.: WO95/14980

PCT Pub. Date: Jun. 1, 1995

[51] Int. Cl.[6] .................................................. G06K 19/067
[52] U.S. Cl. .......................... 235/492; 235/379; 235/380
[58] Field of Search ................................. 235/379, 380, 235/492

[56] References Cited

U.S. PATENT DOCUMENTS 4,277,837  7/1981  Stuckert.

FOREIGN PATENT DOCUMENTS

| 0 159 539 A1 | 10/1985 | European Pat. Off. . |
| 0 267 085 A1 | 5/1988 | European Pat. Off. . |
| 0 565 469 A1 | 10/1993 | European Pat. Off. . |
| 900593 | 2/1990 | Finland . |
| 922402 | 11/1993 | Finland . |
| 2 552 906 | 9/1983 | France . |
| WO 90/03016 | 3/1990 | WIPO . |
| WO 90/04239 | 4/1990 | WIPO . |

*Primary Examiner*—Harold Pitts
*Attorney, Agent, or Firm*—Christensen O'Connor Johnson & Kindness PLLC

[57] ABSTRACT

A data transmission device configured for remote communication with a reading device is provided. The data transmission device includes an identification card and a holding casing. The identification card is provided with visual identifying information about a user of the identification card. The holding casing is removably attached to the identification card. The holding casing includes recording means, and transmission and receiving means. The recording means stores electronically recorded data. The transmission and receiving means is coupled with the recording means to communicate the recorded data to the reading device.

5 Claims, 1 Drawing Sheet

5,736,729

DATA TRANSMISSION CARD AND HOLDING CASING

FIELD OF THE INVENTION

The invention relates to a data transmission device comprising a unit formed of a identification card and its holder enclosure wherein the stored data is read by a distant reading device.

BACKGROUND OF THE INVENTION

At present more and more data transmission devices are being introduced which are small sized devices comprising active and passive data, for example so-called smart cards where a micro chip has been disclosed in a card like a credit card or bank card. The data in the micro chip has to be unloaded and correspondingly the additional data or changed data has to be fed to the card with a suitable reading device. In the latest type of cards the reading is conducted by passing the card at a distance from the reading device. This kind of application is simple and fast because the card does not have to be inserted into the reading device itself but it is sufficient that the user for example passes the reading device whereby the reading device reads the data in the micro chip and changes it simultaneously. These kind of applications are being tested as means of payment in collective transportation systems. The card can of course also be applied to many other purposes, for example, as an identification card an employer to control working hours, simultaneously functioning as an identification card. At the same time the card can be provided with a person's photograph whereby with the assistance of the computer Connected to the control system the corresponding photo appears in the monitor. Thus the personal data and the appearance can be compared to the data on the card.

To equip a thin card with the necessary source of information as well as transmission and receiving means may be difficult. Further the used card cannot be reused if the appearing data is changing, for example if the employee quits the job, the card is useless even if the data can be reprogrammed but the data printed on the card remains the same.

SUMMARY OF THE INVENTION

The aim of the present invention is to create a more advantageuos data transmission device which can be used again and again simply by reprogramming the chip in the card. This is achieved according to the invention with an identification card, which as known per se is provided with the desired identification data whereas the holder card to which the identification card is attached is provided with the transmission/receiving means and storing means for the data intended for cooperation with the corresponding means of the reading device. the manufacture of such a holding card is simple. The holder is usually made of a casing-like part with a closed bottom. In this bottom a recess is made encircling said bottom, in which recess the induction coil functioning as a transmitter and a receiver is arranged, said coil also being connected to the micro chip embedded in the bottom. These transmission and receiving means as well as the recording means are known per se and described for example in U.S. Pat. No. 4,572,776 and PCT application WO 85/03831. It is clear that the means may have other practical solutions, essentially, that the invention consists of a unit comprising a conventional card and a holder thereof provided with receiving and transmission means known per se.

The holder may be like a casing, the bottom of which is equipped with the data transmission and recording means and covered by a protective coating. Over this coating the card is pushed in the usual manner into position and the casing can, by suitable clamp or fastening means, e.g., a needle or the like, be fastened on the garment or the casing can hang around the neck with a suitable chain. In this connection the term "casing" means all kinds of holding or supporting means for conventional plastic cards.

BRIEF DESCRIPTION OF THE DRAWINGS

The invention is explained more in detail by reference to the enclosed drawings, wherein.

DETAILED DESCRIPTION OF THE PREFERRED EMBODIMENT

Figure 3:
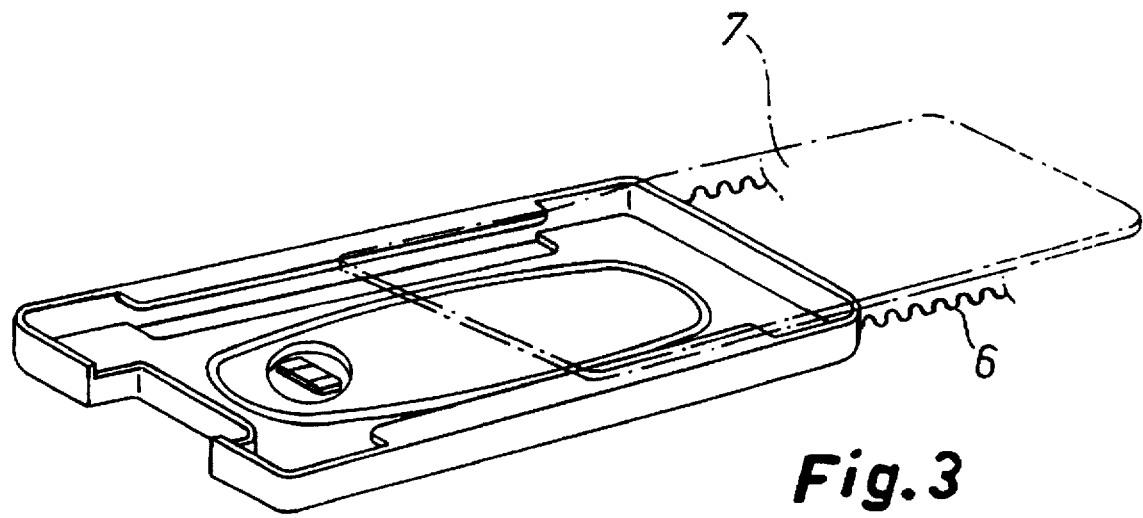
FIG. 3 shows the casing according to FIG. 1 in perspective, the card partly inserted in position.
Figure 1:
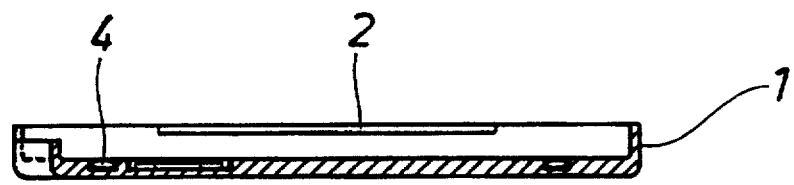
FIG. 1 shows a holder according to the invention in a longitudinal cross section.
Figure 2:
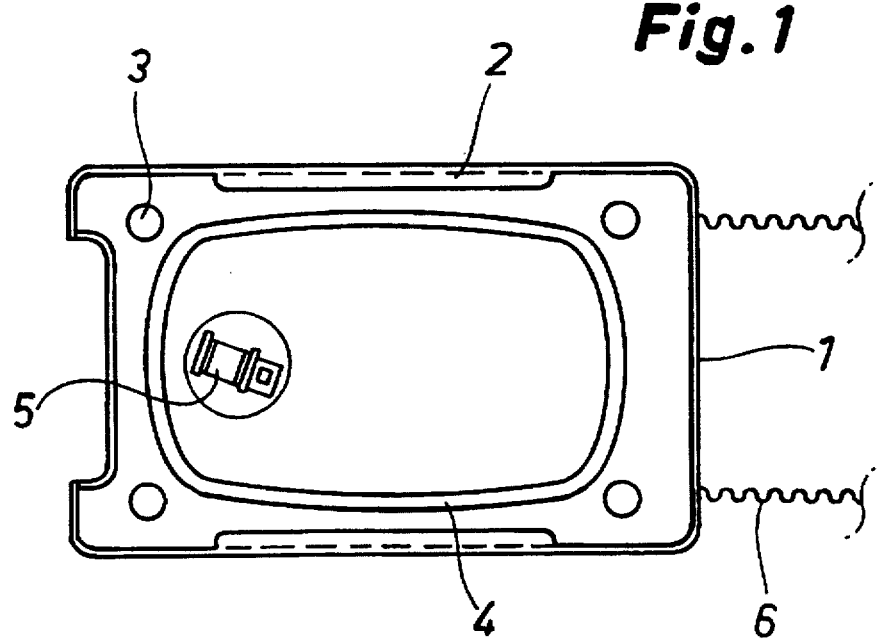
FIG. 2 shows the casing according to FIG. 1 from above.

The invention according to FIGS. 1-3 is thus formed of a casing-like holder 1, being a rectangular casing with relatively low edges. The upper portion of the edges along the longitudinal edges of the card's inwardly projecting flanges 2 are provided for holding the card pushed into the casing. At the bottom of the casing near the four corners thereof are apertures 3 intended for the fastening means of the casing, in the application according to FIG. 3 the ends of the chain 6 have been fastened into the apertures.

The bottom of the casing is provided with an oval recess wherein the induction coil 4 is arranged. The coil is connected to a micro chip 5, which also is embedded in the bottom of the casing. The coil 4 and the micro chip 5 are covered with a protective coating. Thus the means are not damaged when the card is pushed into position in the casing.

In the method of the invention it is still possible to use thin conventional so-called plastic cards provided with conventional data. It is more convenient to provide the casing 1 with means required for data transmission, i.e., the induction coil 4 and the micro chip 5. The plastic card used in this assembly can be easily edited or changed, whereby the casing can be reused by reprogramming it and by entering new or changed data.

The use of the card entity is easy as it is intended to be used together with a reading device, where the reading occurs from a distance. The card and casing are passed before the reading device, whereby the data is transferred to the reading device for further prosecution.

I claim:

1. A data transmission device configured for remote communication with a reading device, comprising:
    (a) an identification card provided with identifying information about a user of said identification card; and
    (b) a holding casing removably attached to said identification card, said holding casing including:
        (i) recording means for storing recorded data; and
        (ii) transmission and receiving means communicatively coupled with said recording means for remotely communicating the recorded data to the reading device.

2. The data transmission device of Claim 1, wherein said identification card is removably inserted into said holding casing.

3. The data transmission device of Claim 1, wherein said recording means includes a reprogrammable microchip.

4. The data transmission device of Claim 1, wherein said transmission and receiving means includes an induction coil.

5. A data transmission device configured for remote communication with a reading device, comprising:

(a) an identification card provided with identifying information about a user of said identification card; and (b) a holding casing removably inserted into said identification card, said holding casing including:

(i) recording means, including a reprogrammable microchip, for storing recorded data; and (ii) transmission and receiving means, including an induction coil, communicatively coupled with said recording means for remotely communicating the recorded data to the reading device.

* * * * *